(12) United States Patent
Strange et al.

(10) Patent No.: US 10,573,467 B2
(45) Date of Patent: Feb. 25, 2020

(54) METHOD OF PRINTING A CONDUCTIVE INK ONTO A CATHODE SURFACE TO INCREASE SURFACE AREA AND CAPACITANCE

(71) Applicant: Pacesetter, Inc., Sunnyvale, CA (US)

(72) Inventors: Thomas F. Strange, Easley, SC (US); David R. Bowen, Taylors, SC (US); Ralph Jason Hemphill, Sunset, SC (US)

(73) Assignee: PACESETTER, INC., Sylmar, CA (US)

(*) Notice: Subject to any disclaimer, the term of this patent is extended or adjusted under 35 U.S.C. 154(b) by 139 days.

(21) Appl. No.: 15/656,178

(22) Filed: Jul. 21, 2017

(65) Prior Publication Data
US 2018/0025847 A1    Jan. 25, 2018

Related U.S. Application Data

(60) Provisional application No. 62/365,083, filed on Jul. 21, 2016.

(51) Int. Cl.
*H01G 9/00* (2006.01)
*H01G 9/042* (2006.01)
*H01G 9/048* (2006.01)

(52) U.S. Cl.
CPC .......... *H01G 9/0029* (2013.01); *H01G 9/048* (2013.01); *H01G 9/0425* (2013.01)

(58) Field of Classification Search
CPC ..................................................... H01G 11/00
See application file for complete search history.

(56) References Cited

U.S. PATENT DOCUMENTS

| | | | |
|---|---|---|---|
| 5,522,851 A | 6/1996 | Fayram | |
| 6,246,569 B1 | 6/2001 | Strange et al. | |
| 7,531,010 B1 | 5/2009 | Feger et al. | |
| 7,715,174 B1 | 5/2010 | Beauvais et al. | |
| 2014/0308576 A1* | 10/2014 | Gaben | C25D 13/02 429/185 |

* cited by examiner

*Primary Examiner* — Seahvosh Nikmanesh
(74) *Attorney, Agent, or Firm* — Theresa A. Raymer

(57) ABSTRACT

A method of processing a metal foil to produce a cathode for an electrolytic capacitor includes printing one or more layers of conductive ink on the metal foil to form a pattern of cathode plates, each of the one or more layers being a predetermined thickness, and the pattern arranged at a distance from a cathode tab and an edge of the cathode plates. The method also includes heating the deposited one or more layers of conductive ink to evaporate a solvent within the conductive ink such that conductive particles of the conductive ink remain deposited on the metal foil. The method further includes sintering the conductive particles and cutting the cathode plates from the metal foil, thereby producing the cathode plates suitable for use in the electrolytic capacitor.

19 Claims, 3 Drawing Sheets

METHOD OF PRINTING A CONDUCTIVE INK ONTO A CATHODE SURFACE TO INCREASE SURFACE AREA AND CAPACITANCE

PRIORITY CLAIM

The present application relates to and claims priority from U.S. provisional application Ser. No. 62/365,083, filed Jul. 21, 2016, entitled "Method Of Printing A Conductive Ink Onto A Cathode Surface To Increase Surface Area And Capacitance," which is hereby expressly incorporated by reference in its entirety to provide continuity of disclosure.

FIELD

The present invention relates generally to the field of electrolytic capacitors and, more specifically, to methods of producing high capacity cathodes for use in electrolytic capacitors.

BACKGROUND

Compact, high voltage capacitors are utilized as energy storage reservoirs in many applications, including implantable medical devices ("IMDs"). These capacitors are required to have a high energy density, since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators typically use two electrolytic capacitors in series to achieve the desired high voltage for shock delivery. For example, an implantable cardioverter defibrillator may utilize two 350 to 475 volt electrolytic capacitors in series to achieve a voltage of 700 to 950 volts.

Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with a solvent-based liquid electrolyte. While aluminum is typically used for the anode foils, other metals such as tantalum, magnesium, titanium, niobium, zirconium and zinc may be used.

A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent.

Electrolytic capacitors are typically formed into flat or cylindrical shapes. For a flat construction, the individual cathode and anode foils or plates are stacked in an interleaved manner with separators interposed there between. For a cylindrical construction, the stacked plates are then rolled up into the form of a substantially cylindrical body, or wound roll, that is held together with adhesive tape and is encased, with the aid of suitable insulation, in an aluminum tube or canister. In both the flat and cylindrical constructions, connections to the anode and the cathode are made via tabs.

In ICDs, as in other applications where space is a critical design element, it is desirable to use capacitors with the greatest possible capacitance per unit volume. Typically, aluminum electrolytic capacitors are designed to increase capacitance by increasing the surface area per projected area of anodes. This requires a higher effective surface area and capacitance from corresponding cathodes to realize all of the anodes' capacitance.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
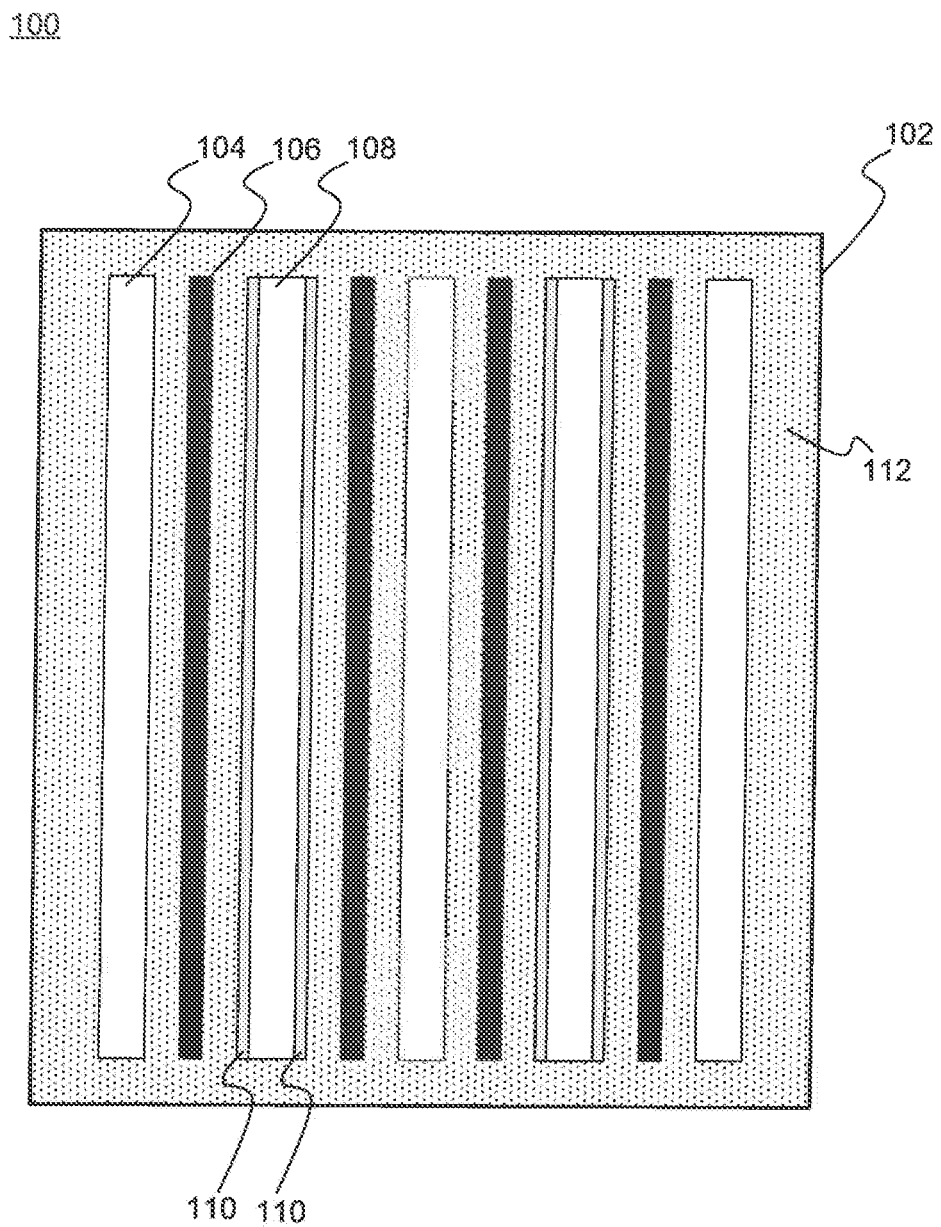
FIG. 1 illustrates a cross-section of an electrolytic capacitor, according to exemplary embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following detailed description of methods and systems for processing metal cathode foils refers to the accompanying drawings that illustrate exemplary embodiments consistent with these methods and systems. Other embodiments are possible, and modifications may be made to the embodiments within the spirit and scope of the methods and systems presented herein. Therefore, the following detailed description is not meant to limit the methods and systems described herein. Rather, the scope of these methods and systems is defined by the appended claims.

It would be apparent to one of skill in the art that the methods and systems for processing metal cathode foils, as described below, may be implemented in many different embodiments without departing from the scope of the description below. Thus, the operation and behavior of the methods and systems will be described with the understanding that modifications and variations of the embodiments are possible, given the level of detail presented herein. It will be apparent to a person skilled in the relevant art that the methods and systems also be employed to produce cathode foils for use in a variety of devices and applications in addition to use in an implantable cardioverter defibrillator (ICD).

The teachings of the present disclosure may be applied to increase the capacitance of capacitors such as those described, for example, in U.S. Pat. Nos. 5,522,851, 6,246,569, 7,531,010, and 7,715,174, each of which is incorporated herein by reference.

FIG. 1 is a schematic diagram illustrating a cross-section of an electrolytic capacitor 100, according to exemplary embodiments of the present disclosure. Capacitor 100 includes a housing 102 that contains a plurality of cathodes 104 alternating with a plurality of anodes 108, and separated by a plurality of separators 106. Each anode 108 includes a dielectric material 110 on or around an outer surface of anode 108. Dielectric material 110 may be an oxide that is thermally grown on, or deposited onto, the surface of anode 108. A high-k (i.e., a high-dielectric constant) dielectric material may be used for dielectric material 110. A conductive electrolyte 112 fills the space between each of the elements within housing 102. Electrolyte 112 may be a polymer or liquid electrolyte as would be understood by one skilled in the art. Example electrolytes include ethylene glycol/boric acid based electrolytes and anhydrous electrolytes based on organic solvents such as dimethylformamide (DMF), dimethylacetamide (DMA), or gamma-butyrolactone (GBL). The plurality of cathodes 104 may be electrically connected to a single, common cathode terminal, and the plurality of anodes 108 may be similarly connected to a single, common anode terminal.

Example materials used by electronic capacitor 100 for the plurality of cathodes 104 include aluminum, titanium, stainless steel, while example materials for the plurality of anodes 108 include aluminum and tantalum. Spacer 106 may be provided to maintain a given separation between each cathode 104 and an adjacent anode 108 within housing 102. Additionally, spacer 106 may be provided to prevent arcing between cathode 104 and anode 108 in spaces where dielectric 110 may be very thin or nonexistent, and/or where a void within electrolyte 112 exists between cathode 104 and anode 108. Spacer 106 may include kraft paper or fabric gauze impregnated with a solvent-based liquid electrolyte.

It should be understood that the various elements and dimensions of capacitor 100 are not drawn to scale. Although each of cathode 104, separator 106, and anode 108 are illustrated as being spaced apart from one another for the convenience of illustration and labeling, it would be understood by one skilled in the art that such elements may also be stacked together in close physical contact with one another.

Conventionally, anodes and/or cathodes are formed of a metal sheet, such as an aluminum sheet, that has undergone electrochemical etching and widening processes to form pores that increase the surface area of metal sheet. However, after additional individual processes are completed on the anode and cathode, the anode typically has a surface area per projected area that is significantly higher than the cathode. Since capacitance of a finished capacitor is the sum of the reciprocal of the anode and cathode capacitance, the significantly lower surface area per projected area for the cathode limits the overall capacitance of the finished capacitor.

In general, etched aluminum cathodes are too low in capacitance to take full advantage of the high anode capacitances that are possible. Titanium or aluminum coated in titanium nitride are therefore commonly used to increase the surface area of a cathode. However, the use of titanium nitride causes several manufacturing problems. For example, during the manufacturing process, the individual cathode plates are cut from a larger sheet, but titanium nitride can be difficult to cut and require the use of additional supplies, such as molybdenum wire, during the cutting process. Additionally, each cathode plate includes a tab, and forming a complete cathode assembly involves laser welding together the tabs from the individual cathode plates. But titanium nitride coatings can cause connection issues when welding together the cathode tabs, necessitating more complex and proprietary methods of attachment. Thus, titanium nitride adds both complexity and cost to a manufacturing process.

A method is disclosed herein that addresses the shortcoming of prior methods. The disclosed method uses commercially available printing technologies to precisely deposit on a metal foil (e.g., titanium or aluminum) a high surface area coating. This allows the coating to be deposited at desired locations on a metal sheet such that, when the individual cathode plates are cut therefrom, the coating will be on desired portions of each cathode plate but not on portions where no coating is desired (e.g., at a portion of the foil that will become a cathode tab or on portions of the foil where cutting will occur when the cathode plate is cut from the larger sheet). The coating is a conductive ink that includes an evaporable solvent (e.g., polyhydroxy alcohol, diethylene glycol (DEG), polyethylene glycol (PEG), and/or water) with nanoparticles of titanium, ruthenium, carbon, carbon structures such as graphene or nanotubes, gold, and/or platinum.

Figure 2:
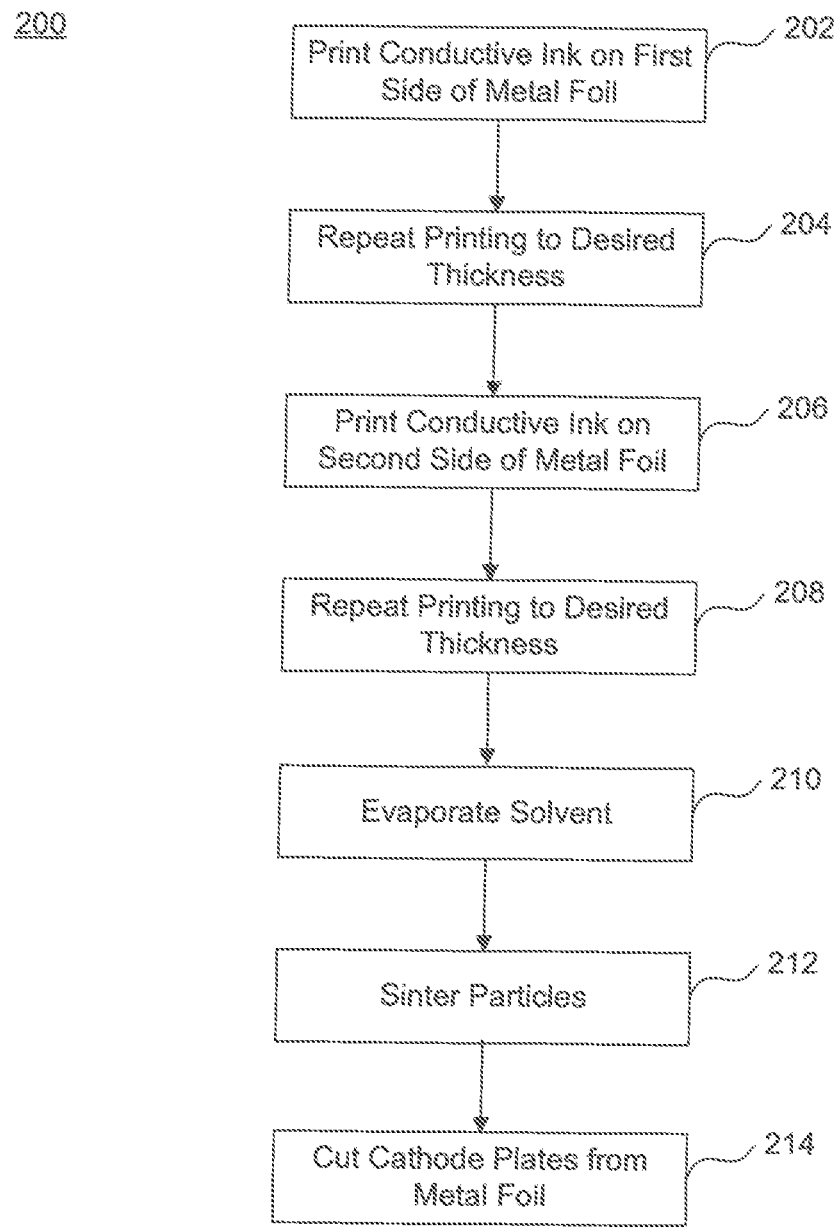
FIG. 2 illustrates a flowchart of an example method of producing a cathode foil, according to exemplary embodiments of the present disclosure.
Figure 3:
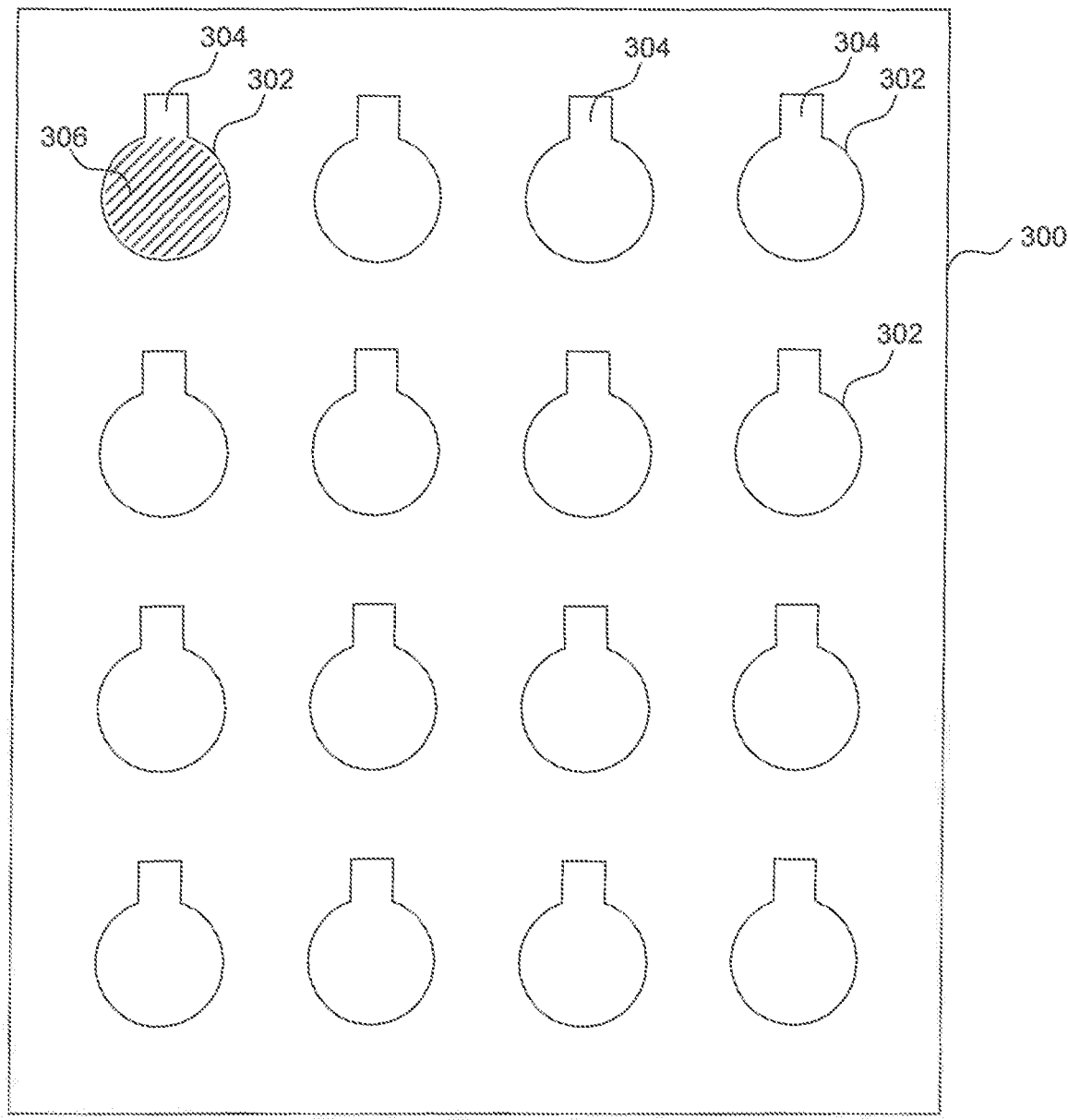
FIG. 3 illustrates a sample metal foil with conductive ink deposited thereon to form a plurality of cathode plates, according to exemplary embodiments of the present disclosure.

FIG. 2 illustrates a flowchart 200 of an example method of producing a cathode foil, according to exemplary embodiments of the present disclosure. Prior to starting, a metal foil and conductive ink are prepared for the process. Preparation of the metal foil may include cutting of the metal foil to a predetermined size. FIG. 3 illustrates a sample metal foil 300. Preparation of the conductive ink may include selecting nanoparticles of a particular size (e.g. 1 nm-100 nm in diameter) and mixing the particles with the solvent to a mixture of, for example, 20 to 40% by weight of the solvent. Particles may be prepared such that a particle size facilitates a reduced sintering temperature. Further, a solvent may be added to the conductive ink to likewise facilitate a reduced sintering temperature. In one example, liquid phase sintering may be used, where, e.g., water may be used as the solvent. In liquid phase sintering takes place in the presence of a liquid phase. The wetting liquid provides a capillary force that pulls the solid particles together and induces particle rearrangement. In addition, the liquid gives rapid mass transport at the sintering temperature. The rapid mass transport results in solution-re-precipitation and improved grain packing by grain shape accommodation. Hence, the presence of a liquid phase during sintering promotes densification in the compacts.

Alternatively, solid phase sintering may be used, such as a sinter-crushing method and a granulation-sintering method. In the sinter-crushing method, conductive particles are sintered and crushed, and then classified if necessary. In the granulation-sintering method, a conductive particles are granulated and sintered, then crushed, and then classified if necessary, to produce conductive nanoparticles.

Next, a layer of conductive ink is printed on a first side of the metal foil (step 202). Printing may be performed by an inkjet printer, gravure printing, or using known screen printing techniques, for example. A desired pattern is printed on the first side of the metal foil. The desired pattern avoids placement of the conductive ink near edges to be cut (i.e., designated cutting areas) and cathode tabs. Further, printing allows a layer of conductive ink to be deposited at a predetermined thickness. Once a first layer of conductive ink has been formed on the metal foil, additional layers of conductive ink can be added by repeating the same process to increase the thickness of the conductive ink (step 204). This may be repeated until a desired, combined layer thickness is achieved. For example, the predetermined thickness of each layer may be around about 1 nanometer to 100 nanometer (nm) in diameter, and the layers may be added such that a combined layer thickness is about 2 nanometers to about 1 micrometer in diameter is achieved after a sintering process. In certain embodiments, the predetermined thickness of each layer may be around about 1 nanometer to 30 nanometers. In certain embodiments, the combined layer thickness is about 2 nanometers to about 3 micrometer after a sintering process. In certain embodiments, the combined layer thickness is about 2 nanometers to about 9 micrometer after a sintering process.

FIG. 3 illustrates a pattern of cathode plates 302 formed or printed on metal foil (sheet) 300. Each cathode plate 302 includes a tab 304. Each cathode plate 302 is covered with conductive ink 306 via the printing process described herein. Tab 304 is not covered with conductive ink 306.

Next, a layer of conductive ink is printed on a second surface (i.e., the opposite side) of the metal foil (step 206). This is performed the same as previously described for the first surface. Likewise, this process is repeated as desired to reach a desired thickness on the second surface of the metal foil (step 208). After the conductive ink layers are deposited, solvent in the conductive ink is evaporated (step 210). The evaporation process includes heating the conductive ink to the evaporation temperature of the solvent such that the solvent in the conductive ink evaporates, leaving only, or substantially only the nanoparticles. Thereafter, the remaining nanoparticles are sintered (step 212). The sintering process involves heating the nanoparticles to a temperature and for a time sufficient to form the particles into a solid mass. The sintering process may include heating the particles to a temperature between 100 and 600° C. Using nanoparticles advantageously decreases the temperature required to sinter the conductive ink, while increasing the surface area of the cathode. Once sintering is completed, an active surface will have been created on the metal foil.

In a step 214, the individual cathode plates are cut (e.g., by laser cutting) from metal foil 300. Cutting is done at a peripheral edge of the cathode plates just outside of the printed conductive ink 306.

Due to the precise arrangement achieved by the printing process, the shortcoming of the prior methods are overcome. The cathode thus formed includes an active coating that increases the capacitance of the cathode and thus increases the energy density of the resulting capacitor. Further, use of a printing process significantly increases the ease of production, while reducing an overall production cost of a capacitor. The printing process also allows for repeatable coating thickness as compared to other processes such as physical vapor deposition. Due to the precision with which patterning can be done, cutting is not constrained by interfering coating material, and issues resulting from welding cathode tabs are significantly reduced.

CONCLUSION

It is to be appreciated that the Detailed Description section, and not the Summary and Abstract sections, is intended to be used to interpret the claims. The Summary and Abstract sections may set forth one or more but not all exemplary embodiments of the present system and method as contemplated by the inventors, and thus, are not intended to limit the present method and system and the appended claims in any way.

Moreover, while various embodiments of the present system and method have been described above, it should be understood that they have been presented by way of example, and not limitation. It will be apparent to persons skilled in the relevant art(s) that various changes in form and detail can be made therein without departing from the spirit and scope of the present system and method. Thus, the present system and method should not be limited by any of the above described exemplary embodiments, but should be defined only in accordance with the following claims and their equivalents.

In addition, it should be understood that the figures, which highlight the functionality and advantages of the present system and method, are presented for example purposes only. Moreover, the steps indicated in the exemplary system(s) and method(s) described above may in some cases be performed in a different order than the order described, and some steps may be added, modified, or removed, without departing from the spirit and scope of the present system and method.

What is claimed is:

1. A method of processing a metal foil to produce cathode plates for an electrolytic capacitor, comprising:
   printing a conductive ink on the metal foil to form a pattern, wherein the pattern covers each of a plurality of cathode plates on the metal foil and defines on each cathode plate a peripheral area upon which conductive ink has not been deposited and a tab area upon which conductive ink has not been deposited, and wherein the conductive ink includes a solvent and conductive particles;
   evaporating the solvent from the ink printed on the foil;
   sintering the conductive particles by heating the metal foil; and
   cutting the metal foil at the peripheral areas of the plurality of cathode plates to remove the cathode plates from the foil.

2. The method of claim 1, wherein the conductive particles are nanoparticles selected from the group consisting of titanium, ruthenium, carbon, carbon graphene, carbon nanotubes, gold, platinum, and mixtures thereof.

3. The method of claim 1, wherein sintering the conductive particles by heating the metal foil comprises liquid phase sintering.

4. The method of claim 1, wherein printing a conductive ink on the metal foil to form a pattern comprises depositing a layer of conductive ink having a thickness of about 1 nanometer to about 100 nanometers.

5. The method of claim 1, wherein printing a conductive ink on the metal foil to form a pattern comprises depositing multiple layers of conductive ink, wherein the combined layer thickness of the multiple layers of conductive ink is about 2 nanometers to about 3 micrometers.

6. The method of claim 1, wherein evaporating the solvent from the ink printed on the foil comprises heating the conductive ink until only the conductive ink remains.

7. The method of claim 1, wherein sintering the conductive particles comprises heating the conductive particles to a temperature between 100° C. and 600° C.

8. The method of claim 1, wherein cutting the metal foil at the peripheral areas of the plurality of cathode plates comprises laser cutting at the peripheral areas outside the pattern of printed conductive ink.

9. The method of claim 1, wherein the solvent is polyhydroxy alcohol.

10. A process for increasing the surface area of a cathode plate, the process comprising:
    printing a conductive ink on a metal foil to form a pattern, wherein the pattern covers each of a plurality of cathode plates on the metal foil and defines on each cathode plate a peripheral area upon which conductive ink has not been deposited and a tab area upon which conductive ink has not been deposited, and wherein the conductive ink includes a solvent and conductive particles;

evaporating the solvent from the ink printed on the foil;

sintering the conductive particles by heating the metal foil; and cutting the metal foil at the peripheral areas of the plurality of cathode plates to remove the cathode plates from the foil.

11. The process of claim 10, wherein the conductive particles are nanoparticles selected from the group consisting of titanium, ruthenium, carbon, carbon graphene, carbon nanotubes, gold, platinum and mixtures thereof.

12. The process of claim 11, further comprising:

preparing the conductive ink by selecting conductive particles having a diameter of between about 1 nanometer to about 100 nanometers; and mixing the conductive particles with the solvent to a mixture of 20% to 40% by weight of the solvent.

13. The process of claim 12, wherein preparing the conductive ink further comprises adding a second solvent configured to reduce a sintering temperature of the conductive particles.

14. The process of claim 10, wherein sintering the conductive particles by heating the metal foil comprises dry phase sintering.

15. The process of claim 10, wherein printing a conductive ink on the metal foil to form a pattern comprises depositing multiple layers of conductive ink, wherein the combined layer thickness of the multiple layers of conductive ink is about 2 nanometers to about 3 micrometers.

16. The process of claim 10, wherein evaporating the solvent from the ink printed on the foil comprises heating the conductive ink until only the conductive ink remains.

17. The process of claim 10, wherein sintering the conductive particles comprises hearing the particles to a temperature between about 100° C. and about 600° C.

18. The method of claim 1, wherein cutting the metal foil at the peripheral areas of the plurality of cathode plates comprises laser cutting at the peripheral areas outside the pattern of printed conductive ink.

19. The process of claim 10, wherein the solvent is polyhydroxy alcohol.

* * * * *